United States Patent [19]

Hammond

[11] Patent Number: 5,582,456
[45] Date of Patent: Dec. 10, 1996

[54] ENCLOSURE AND ACCESSORIES FOR SPORT UTILITY VEHICLE

[76] Inventor: John M. Hammond, 6172 Knickerbocker Rd., Ontario, N.Y. 14519

[21] Appl. No.: 400,371

[22] Filed: Mar. 8, 1995

Related U.S. Application Data

[63] Continuation-in-part of Ser. No. 137,635, Oct. 18, 1993, Pat. No. 5,417,469.

[51] Int. Cl.[6] .................................................... B60P 3/34
[52] U.S. Cl. ........................ 296/163; 296/165; 135/88.07
[58] Field of Search ..................... 296/26, 159, 163–165, 296/167, 174, 176; 135/88.01, 88.05, 88.09, 88.13, 88.07

[56] References Cited

U.S. PATENT DOCUMENTS

| Re. 29,264 | 6/1977 | Woodward | 296/167 |
|---|---|---|---|
| 2,353,820 | 7/1944 | Eddins | 296/26 |
| 3,756,649 | 9/1973 | Wines | 135/88.13 |
| 4,221,425 | 9/1980 | Welle et al. | 296/159 |
| 4,332,265 | 6/1982 | Baker | 296/26 |
| 4,457,553 | 7/1984 | Larkin | 296/163 |
| 4,867,502 | 9/1989 | Sylvester et al. | 296/26 |
| 5,226,689 | 7/1993 | Roe et al. | 296/159 |
| 5,238,288 | 8/1993 | Chandler | 296/26 |

Primary Examiner—Dean Kramer
Attorney, Agent, or Firm—Howard J. Greenwald

[57] ABSTRACT

An apparatus for attaching an enclosure to the back of a motor vehicle which contains a substantially quadrilateral-shaped plate, at least two devices for attaching such plate to the motor vehicle, a cover, and means for attaching the cover to the substantially quadrilateral-shape plate. When the apparatus is attached the motor vehicle, it encloses the space between the back section of such vehicle and such cover and forms a substantially water-proof enclosure covering the space.

13 Claims, 12 Drawing Sheets

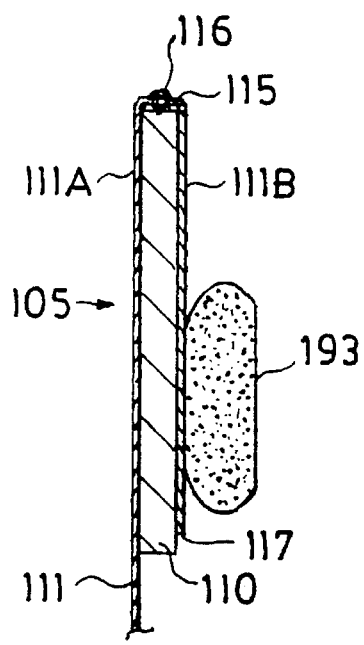
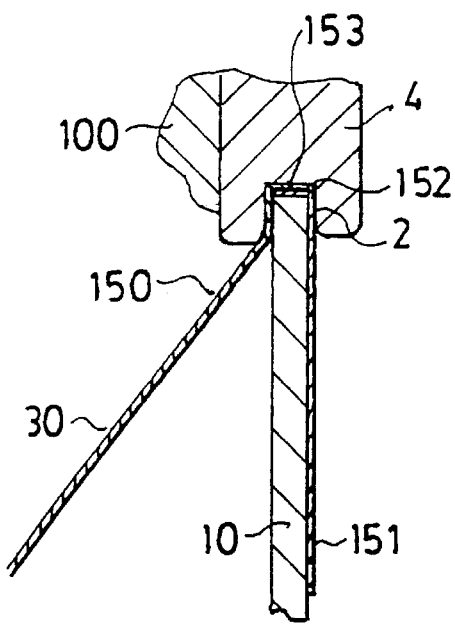
FIG. 20A
FIG. 20B
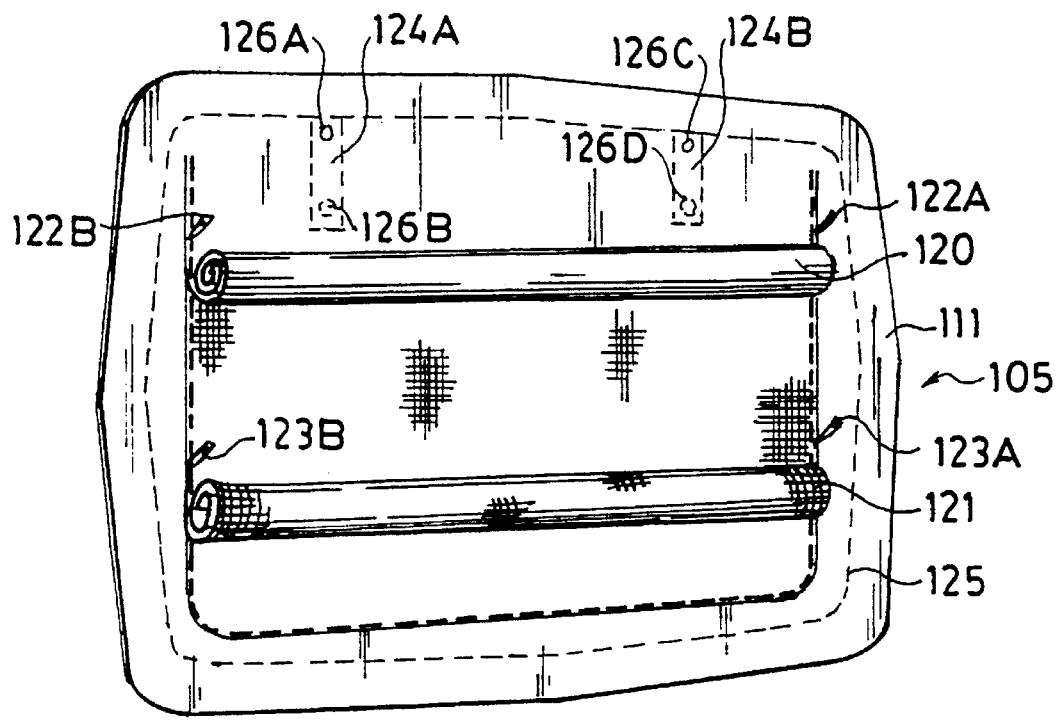
FIG. 21

ENCLOSURE AND ACCESSORIES FOR SPORT UTILITY VEHICLE

CROSS REFERENCE TO RELATED PATENT APPLICATION

This application is a continuation in part of my application Ser. No. 08/137,635, filed Oct. 18, 1993 now U.S. Pat. No. 5,417,469.

SUMMARY OF THE INVENTION

A modular system for camping in a sport utility vehicle which contains a tent-like enclosure which can be fitted over the vehicle tailgate and its associated opening at the rear of the vehicle, an awning, and screened window inserts.

BACKGROUND OF THE INVENTION

Devices which are secured to the rearward portion of motor vehicles for the purpose of recreational camping within the vehicles are well known to those skilled in the art. However, to the best of the applicant's knowledge, no such device or set of devices is available which provides adequate protection from adverse weather conditions, can be easily installed on the vehicle, requires no modifications or additions to the vehicle, and is capable of being easily stored and transported in a compact transporting container.

One prior art camping device was described in July of 1993 in U.S. Pat. No. 5,226,689 of Roe et al. In discussing the problems of conventional tent camping, Roe et al. disclosed (at column 1) that " . . . erecting the tent was usually a lengthy process, often quite complicated." Roe et al. further disclosed (at column 1) that a number of problems exist with prior art camping devices which attach to motor vehicles; among the problems are that " . . . they are not easily erected or taken apart . . . ", and " . . . they do not appear to provide adequate weather-proofing and water leakage and drainage control."

However, the apparatus proposed by Roe et al. in response to these problems is itself a complicated system, which requires a multi-component tube frame assembly, a seal to be joined to the external surface of the vehicle, provisions for sealing around the vehicle's spare tire rack, and a vertical support pole for extending the uppermost portion of the canvas enclosure into a steeple shaped configuration.

It would appear that the apparatus of the Roe et al. patent is not easily erected due to the complex nature of the tube frame which must be fitted together from subassemblies prior to the installation of the fabric covering to the vehicle. Furthermore, it appears that the frame assembly has a degradative effect on the vehicle tailgate paint finish on which it rests, causing mars and scratches to the finish. The durability of the frame assembly when subjected to the repeated rigors of camping also appears to present a problem.

Furthermore, it does not appear that the apparatus of the Roe et al. patent provides adequate protection from adverse weather conditions typically encountered when camping. The apparatus of this patent employs a rubber gasket sealing material attached to the canvas enclosure along its forward-most edge which is in contact with the roof and sides of the vehicle toward the rearward portion of the vehicle. However, in practice, the surface of this particular portion of many motor vehicles intended for use of this apparatus is very often of an irregular and discontinuous nature because of such features as ribbing of the roof surface for structural strength, rain gutters at the edges of the vehicle roof, framing of the vehicle windows, fitting of the vehicle with decorative trim, moldings and accessories such as roof mounted luggage racks, and the like. The rubber gasket sealing means which is secured to the vehicle by the tension of elastic cords in the system of this patent is not likely to properly conform to these numerous surface irregularities.

Additionally, it appears that, when exposed to rain, the steeple-like configuration of the apparatus of the Roe et al. patent directs a large portion of accumulated rain water into contact with the rubber gasket sealing means, causing significant leakage of rain into the vehicle, particularly in the presence of wind directed toward the rearward portion of the vehicle.

The spare tire rack seal disclosed by Roe et al. (at column 5 of their patent) is yet another feature which is likely to result in a leakage of water into the interior of the vehicle, as this seal employs " . . . a synthetic fuzzy fabric that adheres to a mating hook fabric when pressed together." The use of these "VELCRO" fabric components is well known to those skilled in the art of camping equipment design; however, these fabric fastening components are not used in weather sealing applications because the manner in which they join to each other does not provide a seal which excludes the flow of liquids.

The Roe et al. patent is the most recent attempt of which applicant is aware to provide a satisfactory modular system for camping in a sport utility vehicle, and it is far from perfect. However, the system of Roe et al. was superior in many respects to earlier systems described in the prior art.

One such earlier system is described in 1985 in Mary Gunn's U.S. Pat. No. 4,544,195. The Gunn patent discloses a tent-like apparatus which encloses the opening at the rearward portion of a vehicle, including the vehicle tailgate mechanism. However, the device of this patent requires that the vehicle have a rear window which is hinged along the rear roof line and swings outward and upward in order to provide structural support for the tent enclosure and that Gunn's tent-like enclosure be secured to the roof and sides of the vehicle with a series of snaps. Thus, the Gunn apparatus appears to lack sufficient sealing means adequate to prevent leakage of wind and precipitation from entering the vehicle.

Yet another prior art device was disclosed by Robert Straub in 1985 in his U.S. Pat. No. 4,504,049. The device of Straub is suitable only on those vehicles which have a large hatchback that is hinged along the rearward roof line of the vehicle and swings upward to its open position. In an attempt to provide adequate reclining space to occupants of the vehicle, the Straub apparatus requires a rigid panel of material which is fitted to the rear of the vehicle along the lower line of the hatchback opening. Furthermore, the tent-like enclosure portion of the Straub device must be contacted with the vehicle along the rearward roof and side panels of the vehicle. Thus, the Straub device suffers from the same disadvantages as the device of the Roe et al. patent; it does a poor job of excluding rain and wind.

None of the prior art devices known to the applicant include a means for providing additional ventilation from the forward portion of the vehicle on which the device is used. Furthermore, the prior art devices do not include a means for conveniently storing and transporting all system components fitted to the vehicle for the purpose of camping.

It is therefore an object of this invention to provide a camping apparatus to be attached to a sport utility vehicle which is easy to erect and secure to the vehicle.

It is another object of this invention to provide a camping apparatus to be attached to a sport utility vehicle which provides adequate protection from inclement weather. It is a further object of this invention to provide a camping apparatus to be attached to a sport utility vehicle which is lightweight and can be collapsed into a contact shape for easy storage and transportation.

It is another object of this invention to provide a camping apparatus to be attached to a sport utility vehicle which encloses the tailgate of the vehicle, thereby providing occupants of the vehicle with adequate room to recline.

It is another object of this invention to provide a camping apparatus to be attached to a sport utility vehicle which allows easy entry into and exit from the rearward portion of the vehicle.

It is an additional object of this invention to provide a camping apparatus to be attached to a sport utility vehicle which requires no structural modifications or additions to the vehicle and which does not adversely affect the paint finish of the vehicle.

It is a further object of this invention to provide a camping apparatus to be attached to a sport utility vehicle which provides superior ventilation within the vehicle while excluding inclement weather and flying insects.

It is another object of this invention to provide a camping apparatus to be attached to a sport utility vehicle which does not require that a portion of the apparatus be enclosed or sealed around a spare tire rack.

It is another object of this invention to provide a camping apparatus to be attached to a sport utility vehicle containing an awning which provides protection from sun and rain immediately adjacent to the vehicle.

It is an additional object of this invention to provide a camping apparatus to be attached to a sport utility vehicle which includes a lightweight bag for the storage and transportation of all parts of the apparatus.

It is an object of this invention to provide a camping apparatus to be attached to a sport utility vehicle which is inexpensive to manufacture.

SUMMARY OF THE INVENTION

In accordance with this invention, there is provided an apparatus for camping in a sport utility vehicle comprised of a tent-like enclosure joined to a fixturing plate which is secured to the rearward portion of the vehicle, an awning which is joined to the tent-like enclosure and extends outwardly from the rearward area of the vehicle, and a pair of ventilation windows which are fitted to the window openings of the doors of the vehicle, and a fabric bag for the transportation of all of the above components

BRIEF DESCRIPTION OF THE DRAWINGS

The present invention will be more fully understood by reference to the following detailed description thereof, when read in conjunction with the attached drawings, wherein like reference numerals refer to like elements and wherein:

FIG. 20A is a cross sectional view showing means to fit and secure the fabric of the tent like enclosure of FIG. 18 to the fixturing plate of FIG. 19.

FIG. 20B shows an alternative means to fit and secure the fabric of the tent-like enclosure of FIG. 5 to the fixturing plate of FIG. 2.

FIG. 21 is a perspective view of the tent-like enclosure of FIG. 18 joined to the fixturing plate of FIG. 19.

DESCRIPTION OF THE PREFERRED EMBODIMENTS

Figure 1:
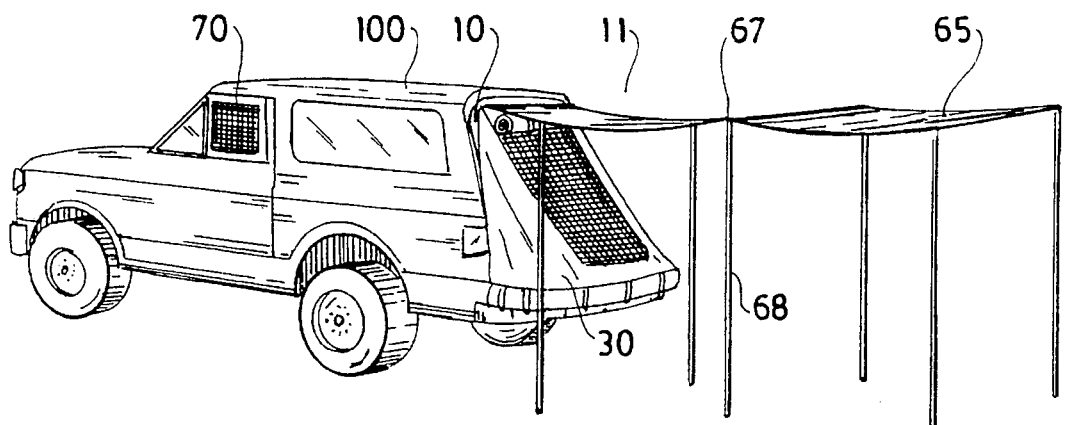
FIG. 1 is a perspective view of the preferred embodiment of the tent-like enclosure, the awning, and ventilation windows of the applicant's invention shown attached to the vehicle.

FIG. 1 is a perspective view of one preferred embodiment of the applicant's invention shown attached to the vehicle. Referring to FIG. 1, it will be seen that applicant's modular apparatus 11 is preferably comprised of a tent-like enclosure 30 joined to a fixturing plate 10 which is secured to the rearward portion of the vehicle 100. In the preferred embodiment illustrated in FIG. 1, applicant's modular apparatus 11 also is comprised of an awning 65 which is joined to the tent-like enclosure 30 and extends outwardly from the rearward area of the vehicle, and, additionally, a pair of ventilation windows 70 (shown, for the sake of simplicity, on only one side of vehicle 100) which are fitted to the window openings of the doors of the vehicle.

As will be apparent to those skilled in the art, the modular system 11 of this invention is especially suitable for use on a recreational vehicle of the type with a rear tailgate and rear sliding glass window retractable into said tailgate and hinged directly above the bumper of the vehicle to pivot from an upright closed position downward to a horizontal open position. This type of recreational vehicle is well known to those skilled in the art and is described, e.g., in U.S. Pat. No. 5,226,689 of Richard P. Roe et al., the entire disclosure of which is hereby incorporated by reference into this specification.

As is known to those skilled in the art, the "Bronco" recreational vehicle is a sport utility vehicle which is sold by the Ford Motor Company of Dearborn, Mich. and which has a rear tailgate and rear sliding glass window retractable into said tailgate and hinged directly above the bumper of the vehicle to pivot from an upright closed position downward to a horizontal open position. The "4-RUNNER" sold by the Toyota Motor Company also is a sport utility vehicle which has a rear tailgate and rear sliding glass window retractable into said tailgate and hinged directly above the bumper of the vehicle to pivot from an upright closed position downward to a horizontal open position. Up until at least as late as 1992, the "BLAZER" sold by the Chevrolet Division of the General Motors Corporation also was a sport utility vehicle which had a rear tailgate and rear sliding glass window retractable into said tailgate and hinged directly above the bumper of the vehicle to pivot from an upright closed position downward to a horizontal open position. Those skilled in the art will be aware of other vehicles with this configuration.

Figure 2:
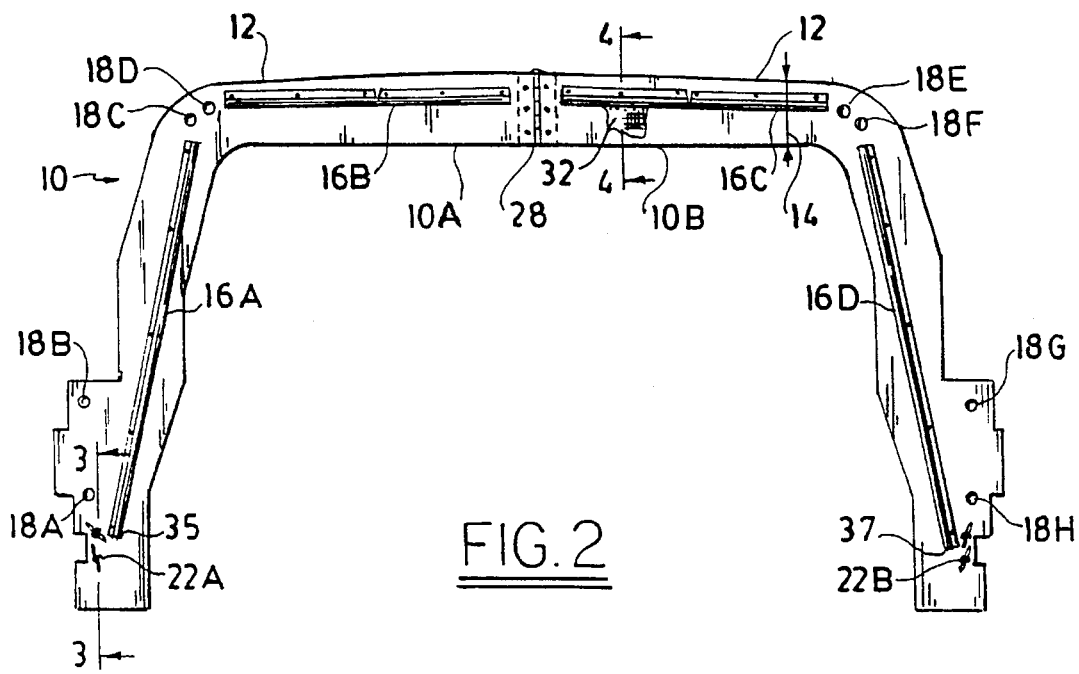
FIG. 2 is an elevation view of the fixturing plate used to secure the tent-like enclosure to the rear of the vehicle.

FIG. 2 is an elevation view of a fixturing plate 10 used to secure the tent-like enclosure 30 (see FIG. 1) to the rear of the vehicle 100 (see FIG. 1).

Referring to FIG. 2, said fixturing plate 10 preferably is a substantially U-shaped structure which, in one embodiment, preferably consists essentially of rigid, light weight plastic such as high density polypropylene, high density polyethylene, nylon, or other suitable plastic. These plastic materials are well known to those skilled in the art and are described, e.g., in the "Modern Plastics Encyclopedia," which is the mid-October 1991 issue of "Modern Plastics" (Volume 68, No. 11) published by Modern Plastics of P.O. Box 481, Highstown, N.J.

As is known to those skilled in the art, sheets of such plastic may be commercially purchased, cut to the desired size and shape, affixed with the required orifices, and secured to the appropriate fixtures. Thus, by way of illustration, one may purchase a sheet of high-density polypropylene which is 3.0'×6.0' by ¼" from the Cadillac Plastics and Chemical Company of 1328 University Avenue, Rochester, N.Y.

Alternatively, or additionally, fixturing plate 10 may be comprised of aluminum, plywood, composite material, and/or other rigid material, preferably in sheet form.

In one preferred embodiment, fixturing plate 10 is preferentially of a thickness which is at least as thick as the thickness of the tailgate window of the vehicle 100 (see FIG. 1). Thus, for example, when the tailgate window of vehicle 100 is 0.25 inches thick, one may, e.g., use a fixturing plate which is at least about 0.25 inches thick. In general, it is preferred that the thickness of plate 10 be from about 0.2 to about 0.4 inches.

Figure 4:
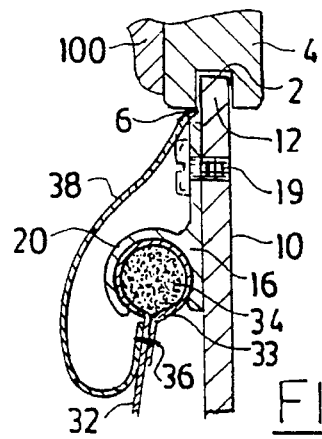
FIG. 4 is a detailed section view of awning rail means adapted to secure the tent-like enclosure to the fixturing plate of FIG. 2.

Referring again to FIG. 2, and also to FIG. 4 when the fixturing plate 10 is secured to the vehicle 100 (see FIG. 1), the upper edge 12 of said fixturing plate 10 is inserted into the gasket groove 2 of the tailgate window gasket 4 existing at the rear of the vehicle 100. Said gasket groove 2 is normally used for the purpose of providing a seal around the edge of the tailgate window when said window (not shown) is in its closed (raised) position. Thus both securing of the fixturing plate 10 and sealing of the fixturing plate 10 is achieved when said fixturing plate 10 is inserted into said gasket groove 2.

Referring again to FIG. 2, the fixturing plate 10 preferably has an upper edge 12 has a shape which is identical or substantially identical to the upper edge (not shown) of the tailgate window of the vehicle; thus, in the embodiment depicted in FIGS. 1 and 2, fixturing plate 2 is substantially thus crescent shaped.

Referring again to FIG. 2, the width 14 along any section of said crescent shape fixturing plate 10 preferably ranges from about between 2 and 4 inches. In one embodiment of the applicant's fixturing plate 10, the use of 0.25 inch thick high density polypropylene with a width 14 of 3–4 inches along said crescent shaped fixturing plate 10 was found to provide adequate structural strength, light weight, and effective sealing from adverse weather when fitted to said tailgate window gasket groove 2 of the vehicle 100. Referring again to FIG. 2, awning rails 16A, 16B, 16C, and 16D and snaps 18A, 18B, 18C, 18D, 18E, 18F, 18G, and 18H may be affixed to fixturing plate 10 and are used as means to secure the tent-like enclosure 30 to the fixturing plate 10. Mating snaps are provided to be joined with snaps 18A through 18H at the corresponding points of contact of the tent-like enclosure 30 to the fixturing plate 10.

Fixturing plate 10 is comprised of a multiplicity of awning rails 16A et seq. adapted to receive and secure the tent like enclosure 30. These awning rails are well known to those skilled in the art and are commonly used in camping equipment and recreational vehicle design to secure flexible fabric to a rigid surface. They are readily commercially available and may be purchased from, e.g., R. V. Corral Company of Ontario, N.Y.

The use of awning rails 16A through 16D is illustrated in detail in FIG. 4. Referring to FIG. 4, which illustrates one embodiment of applicant's invention, awning rail 16 is secured to fixturing plate 10 via screw 19. Alternatively, said awning rail 16 could be suitably secured to said fixturing plate 10 via rivets, adhesive, or other fastening means well known in the art.

The tent like enclosure 30 which is secured by the awning rail 16 may be fabricated by conventional means. Thus, in the construction of the tent-like enclosure 30 of FIG. 1, the fabric 32 shown in FIG. 4 is wrapped around a flexible cord 34 and joined unto itself via stitching 36, thereby enclosing cord 34 in a loop 33 of fabric 32.

The particular awning rail illustrated in FIG. 4 is fabricated with a solid arc shaped section 20 encompassing approximately 270 degrees of circular arc; the diameter of said arc shaped section 20 is slightly greater than the diameter of said cord 34.

During the securing of the tent-like enclosure 30 of FIG. 1 to the fixturing plate 10, the loop of fabric 32 enclosing the flexible cord 34 is fitted along the inside of the awning rail, thus joining the fabric to the awning rail in a manner well known in the art of camping equipment and recreational vehicle design.

Referring again to FIG. 2, the length of cord 34 of FIG. 4 enclosed in said loop of fabric 32 of FIG. 4 extends from the lower extremity 35 of awning rail 16A, upward along awning rail 16A, horizontally along awning rails 16B and 16C, and downward along awning rail 16D, to lower extremity 37. The tent-like enclosure 30 is thus fastened to the fixturing plate 10 along the entire length of the awning rails 16A through 16D. The tent-like enclosure 30 may be further secured to the fixturing plate 10 via snaps 18A through 18H.

It will be apparent to those skilled in the art that other configurations of awning rail(s) may be used to secure the tent-like enclosure 30. Thus, e.g., one may use a single continuous strip of awning rail around said fixturing plate of FIG. 2.

The awning rail 16 (see FIG. 4) can consist essentially of aluminum, plastic, or other suitable material, and said awning rail may be molded as an integral part of said fixturing plate in manufacturing of said fixturing plate. Furthermore, instead of using said one or more of said awning rails 16 to secure enclosure 30, one may use devices such as closely spaced snap means, rivets, sewing means, fuzzy fabric and hook mating fabric means, etc. The use of the awning rail(s) is preferred because disassembly of said tent-like enclosure 30 from the fixturing plate 10 of FIG. 1 is easily achieved, thus making laundering, repair, etc. of said tent-like enclosure 30 convenient.

The use of the awning rail means is one preferred means because a complete seal of the tent-like enclosure 30 of FIG. 1 to the vehicle is achieved. Thus, e.g., referring again to FIG. 4, an additional short flap of fabric 38 may be sewn onto the fabric 32 of the tent-like enclosure; and, during installation of said enclosure on the vehicle, after said fixturing plate 10 is fitted into groove 2 of tailgate window gasket 4, said flap of fabric 38 may be tucked into recessed area 6 along the entire length of the tailgate window gasket 4.

Alternative means may also be used to secure the tent like enclosure 30 of FIG. 1 to the fixturing plate 10 of FIG.2. One alternative means is depicted in FIG. 20B.

Referring to FIG. 20B, applicant's fabric enclosure is comprised of an outer section of fabric 150 and an inner section of fabric 151 which are joined at a seam 152 by thread 153 or other suitable means. The construction of enclosure 30 is such that inner surface 151 is joined to outer surface 150 around a substantial portion of the perimeter of the fixturing plate 10. Inner surface 151 is also dimensioned to be of approximately the same width as fixturing plate 10, (of the order of several inches) such that inner surface 151 forms a pouch-like enclosure around fixturing plate 10 around a substantial portion of its perimeter.

Referring again to FIG. 20B, when the fixturing plate 10 and fabric enclosure 30 are inserted into tailgate gasket groove 2 when installing the applicant's modular apparatus on the vehicle, said fixturing plate 10 and fabric enclosure 30 are securely joined to each other without the use of additional fasteners.

This feature will enable lower product cost. If for some vehicles, additional fasteners are required, conventional fastening means for securing fabric to a flat surface may be used, such as snaps, or hook and barb mating fabrics.

Figure 3:
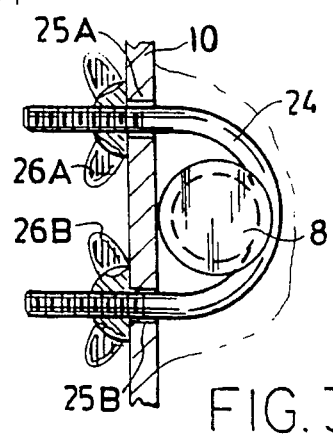
FIG. 3 is a detailed section view of U-bolt means adapted to secure the fixturing plate of FIG. 2 to the vehicle

Applicant's fixturing plate 10 may be further secured to the vehicle 100 by fastener means 22A and 22B. FIG. 3 is a detailed sectional view illustrating wings nuts 26A and 26B which correspond to fastener means 22A and 22B (not shown in FIG. 3) and how such wing nuts 26A and 26B secure the fixturing plate 10 to the vehicle 100. Referring to FIG. 3, and in the preferred embodiment illustrated therein, U-bolt 24 extends through holes 25A and 25B in fixturing plate 10, and is secured to said fixturing plate 10 by wing nuts 26A and 26B. When the applicant's tent-like enclosure 30 is in stalled on the vehicle 100, U-bolt 24 is tightly secured around vehicle tailgate latch post 8 (see FIG. 3) by wing nuts 26A and 26B.

Thus, applicant's fixturing plate 10 is rigidly secured to the vehicle 100, with horizontal movement of the fixturing plate 10 prevented by insertion into the tailgate gasket groove 2 (see FIG. 4) of the vehicle 100, and by U-bolt means 26 (see FIG. 3); and vertical movement of said fixturing plate 10 is prevented by U-bolt means 24. As will thus be readily apparent to those skilled in the art, the fixturing plate 10 of applicant's modular system 11 may be readily attached to or removed from the vehicle 100 without the need to modify or add to the vehicle structure.

Applicant's tent-like enclosure 30 is compact and easily stored and can be readily transported when not installed on the vehicle 100.

Figure 15:
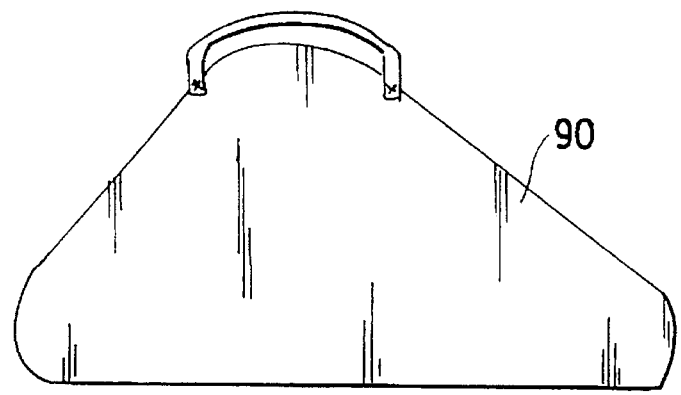
FIG. 15 is a side elevation view of the storage bag of the applicant's invention for the transportation and storage of the tent-like enclosure, windows, and awning of FIG. 1.

Referring again to FIG. 2, and in the preferred embodiment illustrated therein, the fixturing plate 10 is preferably fabricated in two halves 10A and 10B, and joined together by hinge 28. Consequently, when said fixturing plate 10 and the attached tent-like enclosure 30 are not installed on the vehicle 100, the two halves 10A and 10B can be pivoted onto each other by the operation of hinge 28. The collapsed apparatus (not shown) thus assumes a triangular shape, and can be stored and transported in the bag 90 (see FIG. 15).

Figure 17:
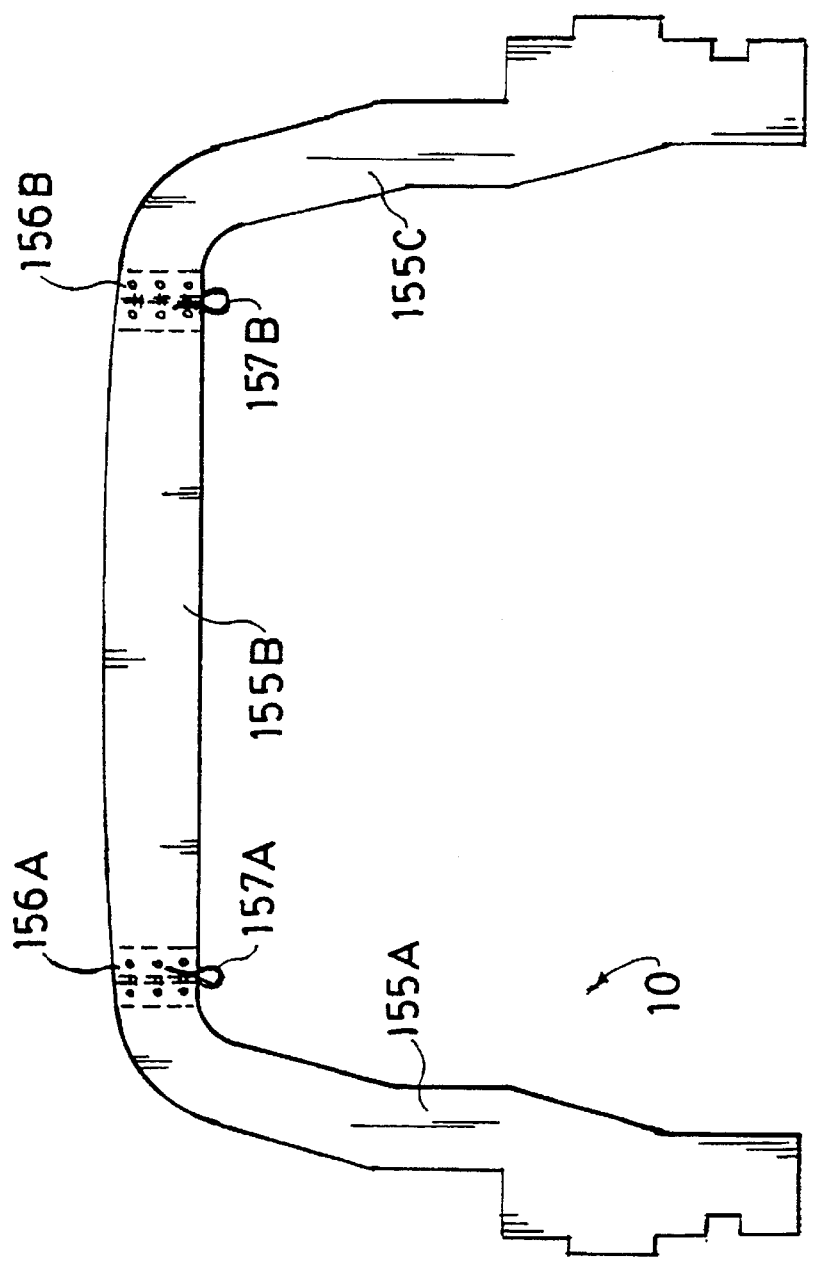
FIG. 17 is an alternative embodiment of applicant's U-shaped fixturing plate shown in FIG. 2.

Instead of, or in addition to hinge 28, one may use other means for attaching halves 10A and 10B. Thus, by way of illustration and not limitation, one may use a joint with a removable pin. Alternatively, or additionally, a plurality of hinges or joints may be provided on different portions of the fixturing plate to achieve even more compact storage of the apparatus. FIG. 17 depicts one alternative embodiment of applicant's fixturing plate.

Referring to FIG. 17, applicant's fixturing plate 10 is comprised of three subsections 155A, 155B, and 155C joined together by hinges 156A and 156B which are fitted with removable pins 157A and 157B. It will be readily apparent to those skilled in the art that when pins 157A and 157B are removed from hinges 156A and 156B, applicant's fixturing plate can be collapsed and stored in a substantially compact shape.

In one embodiment, not shown, means are provided for locking halves 10A and 10B into a substantially coplanar relationship after they have aligned into such relationship.

Figure 6:
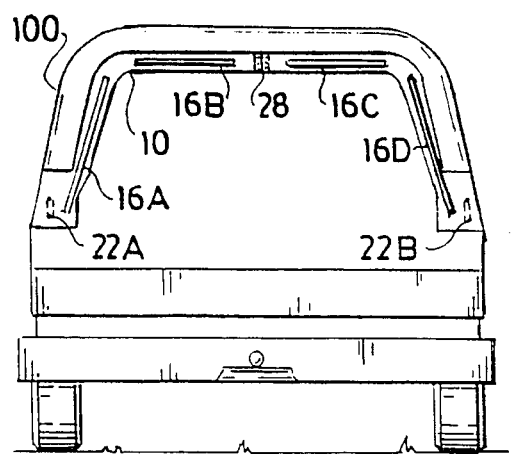
FIG. 6 is a rear elevation view showing the fit of the fixturing plate of FIG. 2 to the rear of the vehicle.
Figure 7:
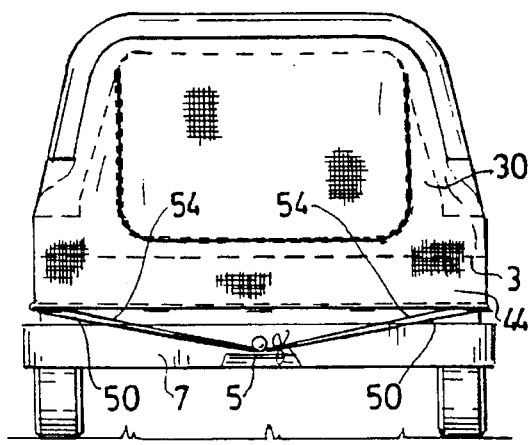
FIG. 7 is a rear elevation view showing the fit of the tent-like enclosure of FIG. 5 to the rear of the vehicle.

FIG. 6 is a rear elevation view showing the mounting of the fixturing plate 10 to the rear of the vehicle 100; in this FIG. 6, the tent-like enclosure 30 has been omitted for the sake of simplicity, it being apparent that, in practice, the applicant's tent-like enclosure 30 of FIG. 7 is installed on the vehicle as a complete assembly joined to the fixturing plate 10 of FIG. 6.

Figure 5:
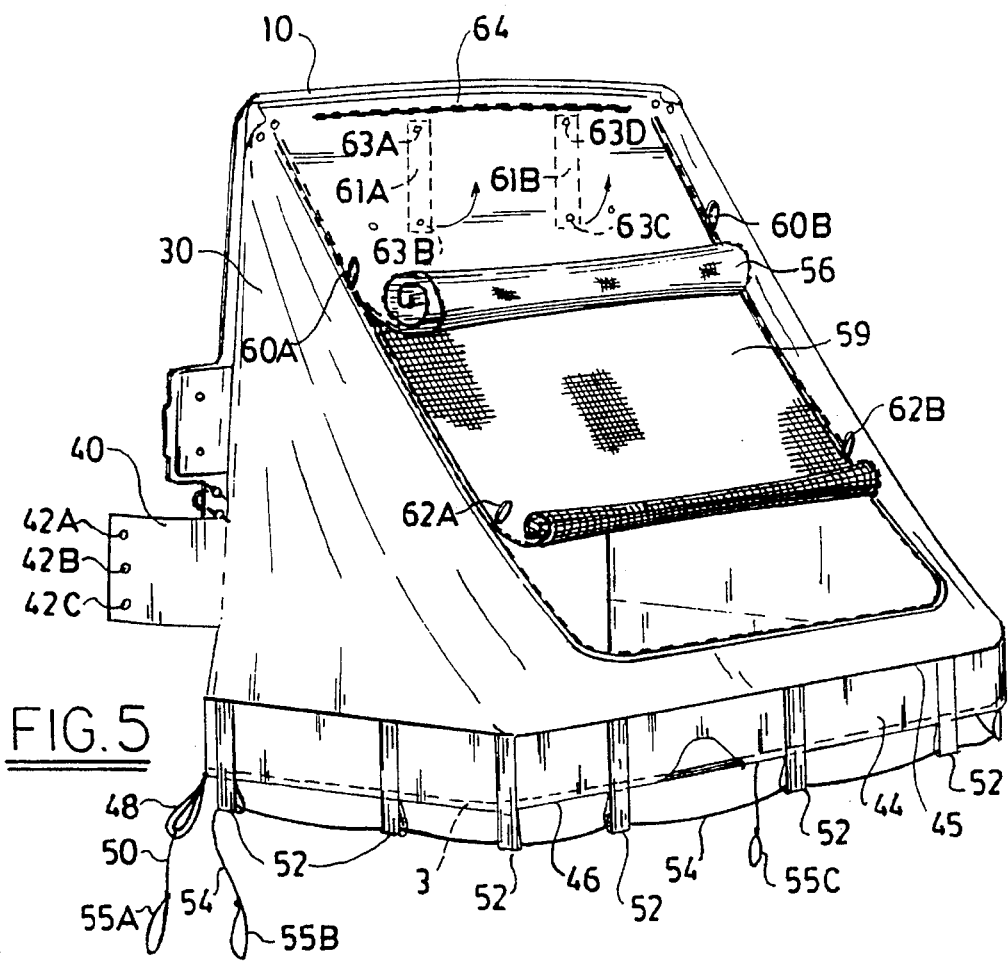
FIG. 5 is a perspective view of a preferred embodiment of the tent-like enclosure of FIG. 1 joined to the fixturing plate of FIG. 2.

FIG. 5 is a perspective view of one preferred embodiment of the tent-like enclosure 30 joined to the fixturing plate 10. FIG. 5 also depicts some preferred means of securing the tent-like enclosure 30 around the opened tail gate 3 of the vehicle 100, as well as numerous additional features of the tent-like enclosure 30.

The tent-like enclosure 30 may be constructed from any suitable weather and sunlight resistant fabric customarily used in the construction of camping tents. In one embodiment of applicant's invention, said tent-like enclosure 30 is constructed of acrylic polymer canvas fabric. Alternatively, said tent-like enclosure could be constructed of nylon (a polyamide sold by E. I. Dupont Co.), Gore-Tex (a substantially water-proof fabric material sold by the W. L. Gore Inc.), and the like.

By way of further illustration, the weather-resistant fabric used in tent-like enclosure 30 may be one or mere of the weather-resistant fabrics disclosed in U.S. Pat. Nos. 5,035,006, 4,977,719, 4,866,898, 4,843,994, and the like. The disclosure of each of these United States patents is hereby incorporated by reference into this specification.

Referring again to FIG. 5, the tent-like enclosure 30 may be further secured to the inner wall 1 (see FIG. 8) of the vehicle 100 adjacent to the tailgate opening by flaps of fabric 40 (see FIG. 5) on each side of the tent-like enclosure 30; for the sake of simplicity, only one such fabric flap 40 is shown in FIG. 5. To said flaps of fabric 40 are attached conventional fastening means, such as snaps 42A, 42B, and 42C. Alternatively, or additionally, other fastening means (such as a fuzzy fabric to be mated with a hook fabric) can also be used.

Figure 8:
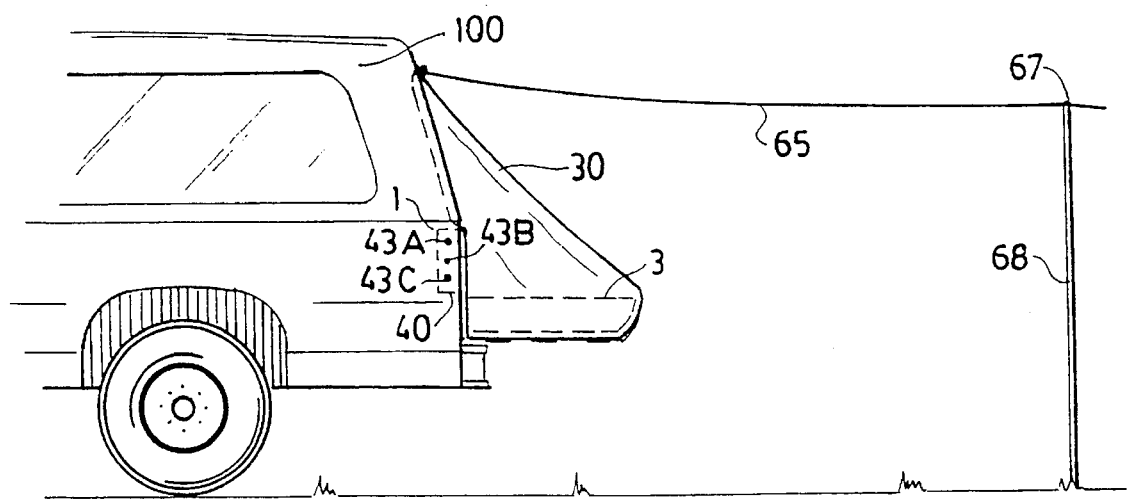
FIG. 8 is a side elevation view showing the fit of the tent-like enclosure of FIG. 5 and awning of FIG. 9 to the rear of the vehicle.

Referring to FIG. 8, in the corresponding position on the inner wall 1 of the vehicle 100, mating fasteners 43A, 43B, and 43C are suitably secured to inner wall 1, thereby enabling said flap of fabric 40 (shown in phantom) to be secured to said inner wall 1 of the vehicle 100.

The applicant's tent-like enclosure 30 may be further secured to the tailgate 3 of the vehicle 100 by additional fastening means, some of which are illustrated in FIG. 5. Referring to FIG. 5, a skirt of material 44 is provided at the base 45 of the tent-like enclosure 30 along the area of contact of said tent-like enclosure 30 which is in contact with the opened tailgate 3 of the vehicle, shown in phantom. At the lower extremity 46 of said skirt of material 44, an elastic cord (not shown) is sewn into a loop of fabric of the skirt of material 44. The elastic cord preferably extends around the lower perimeter of the skirt of material 44.

At several points at the lower extremity 46 of the skirt of material 44 which is closest in proximity to the vehicle, short loops of fabric 48 are suitably attached to the skirt of material 44. A length of cord 50 with a knotted loop 55A is tied to said short loop of fabric 48. A series of wide loops of fabric 52 are also suitably attached to said skirt of material 44 around its perimeter. Through said wide loops of fabric 52 is strung a length of cord 54 with knotted loops 55B and 55C formed in each end.

Referring to FIG. 7, it will be apparent that when said lengths of cord 50 and 54 of FIG. 5 are secured under tension to trailer ball 5 on vehicle rear bunker 7, said skirt of material 44 is snugly drawn around said opened tailgate 3 (shown in phantom). Alternatively, or additionally, said lengths of cord 50 and 54 could be secured to other points of attachment of vehicle rear bunker 7, or other points of the vehicle undercarriage.

Thus it will be apparent that said tent like enclosure 30 can be fully secured to the vehicle 100 in a manner which allows such enclosure 30 to exclude inclement weather. Additional features are preferably provided on applicant's tent like enclosure 30 for the convenience of use. Referring to FIG. 5, a fabric doorway 56 and screen 58 fore the major area of the central portion 59 of the tent-like enclosure 30. Doorway 56 and screen 58 may be opened by the operation of zippers 60A and 60B, and 62A and 62B, respectively. Fabric doorway 56 and screen 58 may be secured in a rolled up open position by fabric loops 61A and 61B which are fitted with snaps 63A, 63B, 63C, and 63D, or other joining means.

Thus, the doorway 56 and screen 58 may be positioned for easy entry into and exit from the vehicle, for maximum ventilation within the vehicle, and for maximum protection from inclement weather. The zippers 60A and 60B of said doorway 56 are fabricated with a narrow flap of material (not shown) which covers said zippers 60A and 60B and prevents leakage of water through the zippers 60A and 60B.

Figure 9:
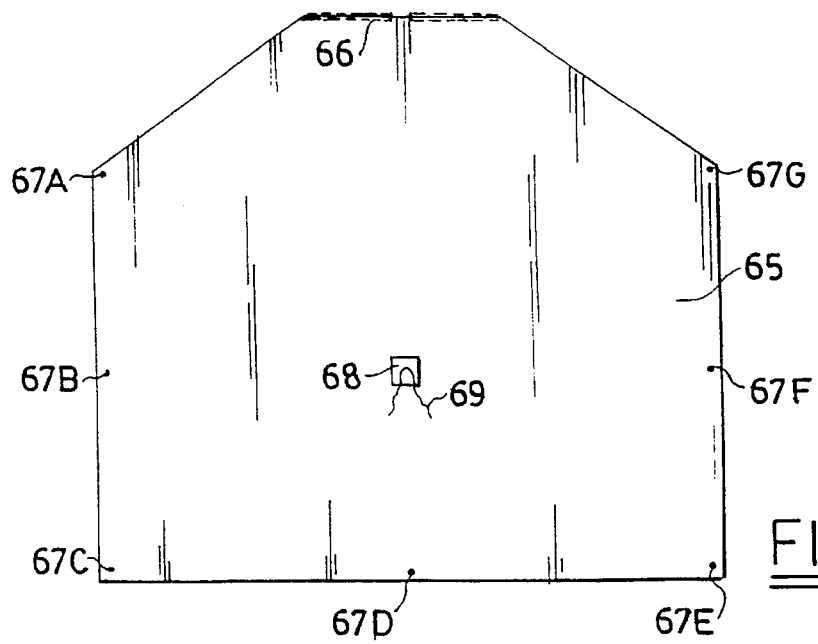
FIG. 9 is a plan view of one embodiment of the awning of applicant's invention.

FIG. 9 is a plan view of one embodiment of the fabric awning 65 used in the structure of FIG. 8. The fabric awning 65 can be constructed of the same variety of weather resistant fabric as previously described for applicant's tent-like enclosure 30, or it may be comprised of different material.

Referring to FIG. 9, fabric awning 65 is preferably equipped with zipper 66, grommets 67A through 67G, reinforcement patch 68 of fabric, and cord 69 suitably fastened to said reinforcement patch 68. To attach said fabric awning 65 to said tent like enclosure 30, zipper 66 of FIG. 9 is joined to zipper 64 of FIG. 5.

Referring again to FIG. 1, said awning 65 is fixed in a horizontal position behind the vehicle by the use of poles 68, which are fixed in position by the use of cords (not shown) tied to the poles 68 and tied to stakes in the ground (not shown).

Figure 10:
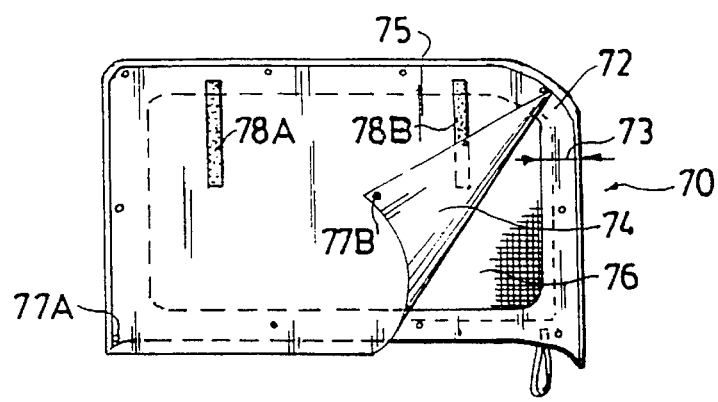
FIG. 10 is a view of the preferred embodiment of the ventilation window assembly of applicant's invention.

FIG. 10 is a perspective view of a preferred embodiment of the ventilation window assembly 70 of applicant's invention. Referring to FIG. 10, applicant's ventilation window 70 is preferably comprised of a fixturing plate 72, fabric covering 74, and screen 76. Fixturing plate 72 can be constructed of the same variety of materials as previously described for applicant's fixturing plate 10. Fabric covering 74 can be constructed of the same variety of weather resistant fabrics as previously described for applicant's tent-like enclosure 30.

Fabric covering 74 and screen 76 are suitably fastened to fixturing plate 72 by the use of conventional fastening means such as snaps, sewing, rivets, or the mating of a fuzzy fabric with a hook fabric. Fabric covering 74 can be rolled up and secured in a rolled up state by the use of strips of fuzzy fabric and hook fabric 78A and 78B to achieve maximum ventilation flow of air through the screen 76 of ventilation window 70.

In one embodiment of applicant's ventilation window 70, fixturing plate 72 was constructed of ⅛ inch thick high density polypropylene; the width 73 of fixturing plate 72 around the perimeter of said fixturing plate was 2 inches; fabric covering 74 was constructed of acrylic polymer canvas fabric; screen 76 was sewn to said fixturing plate 72 around the perimeter of said fixturing plate 72; and said fabric covering 74 was fastened to said fixturing plate 72 by sewing along upper edge 75, and by snaps 77A and 77B in the lowered position of said fabric covering.

Figure 11:
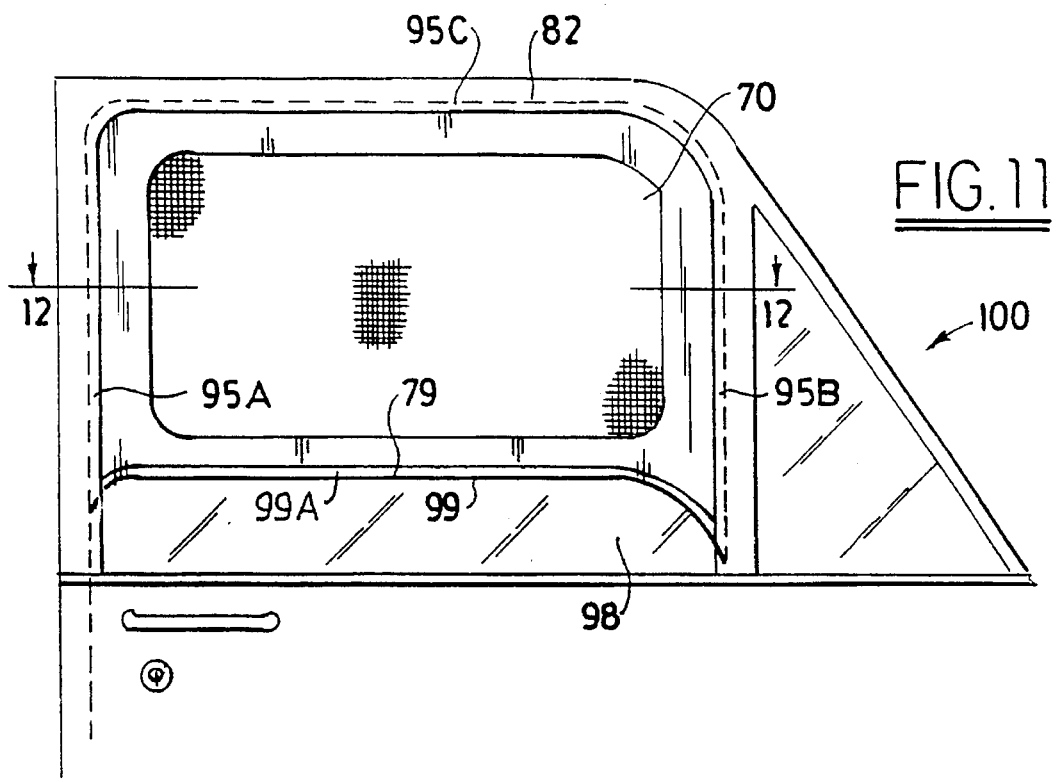
FIG. 11 is an elevation view of the ventilation window of FIG. 10 shown installed in the vehicle door.

FIG. 11 is an elevation view of the ventilation window 70 of FIG. 10 shown installed in the vehicle door, with the fabric covering 74 not shown for the sake of simplicity. The manner of installation of applicant's ventilation window 70 in the window opening of the vehicle door is shown in FIGS. 12 through 14.

Figure 12:
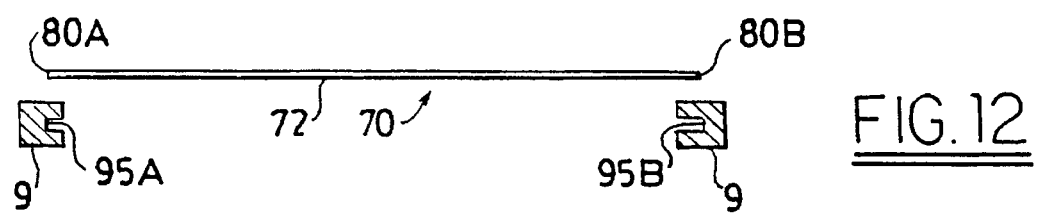
FIGS. 12, 13, and 14 is a section view of the ventilation window assembly of FIG. 10 depicting the sequence of installation of the assembly into the window gasket channel of the door of the vehicle.

Referring to FIG. 12, which is vertical sectional view taken along lines 12—12 of FIG. 11, ventilation window 70 is brought into close proximity to the door window gasket 9 of the vehicle 100.

Figure 13:
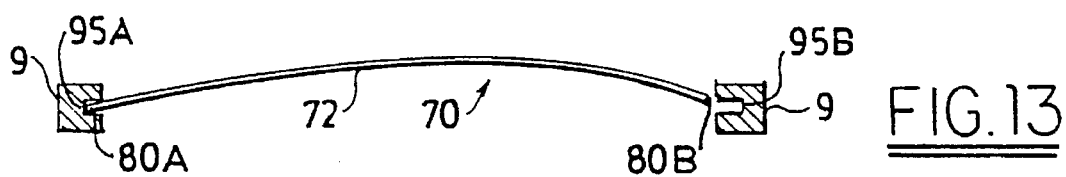
Figure 14:
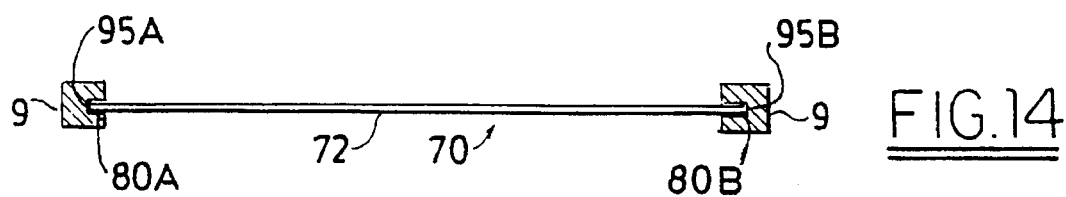

FIGS. 13 and 14 illustrate the mounting of the fixturing plate 72. Referring to FIG. 13, fixturing plate 72 edge 80A is inserted into door window gasket groove 95A and fixturing plate 72 is put under compression resulting in the temporary bending of fixturing plate 72. Fixturing plate 72 edge 80B is then inserted in door window gasket groove 95B, and the compressive force on fixturing plate 72 is then released. Fixturing plate 72 is thus fitted into door window gasket grooves 95A and 95B of FIG. 14 as shown.

Referring again to FIG. 11, ventilation window 70 is then slid vertically upward such that the upper edge 82 (shown in phantom) of fixturing plate 72 is fully inserted in the upper portion of the vehicle door window gasket groove 95C. To complete the installation of the ventilation window 70, the vehicle window 98 is raised until the upper edge 99 of said vehicle window 98 comes in snug contact with the lower edge 79 of the fixturing plate 72 of the ventilation window. The lower edge 79 of said fixturing plate 72 is dimensioned precisely the same as the upper edge 99 of the vehicle window 98, so that when the two edges 79 and 99 come into close contact, a good fit and seal of the ventilation window 70 to the vehicle door is achieved.

Figure 16:
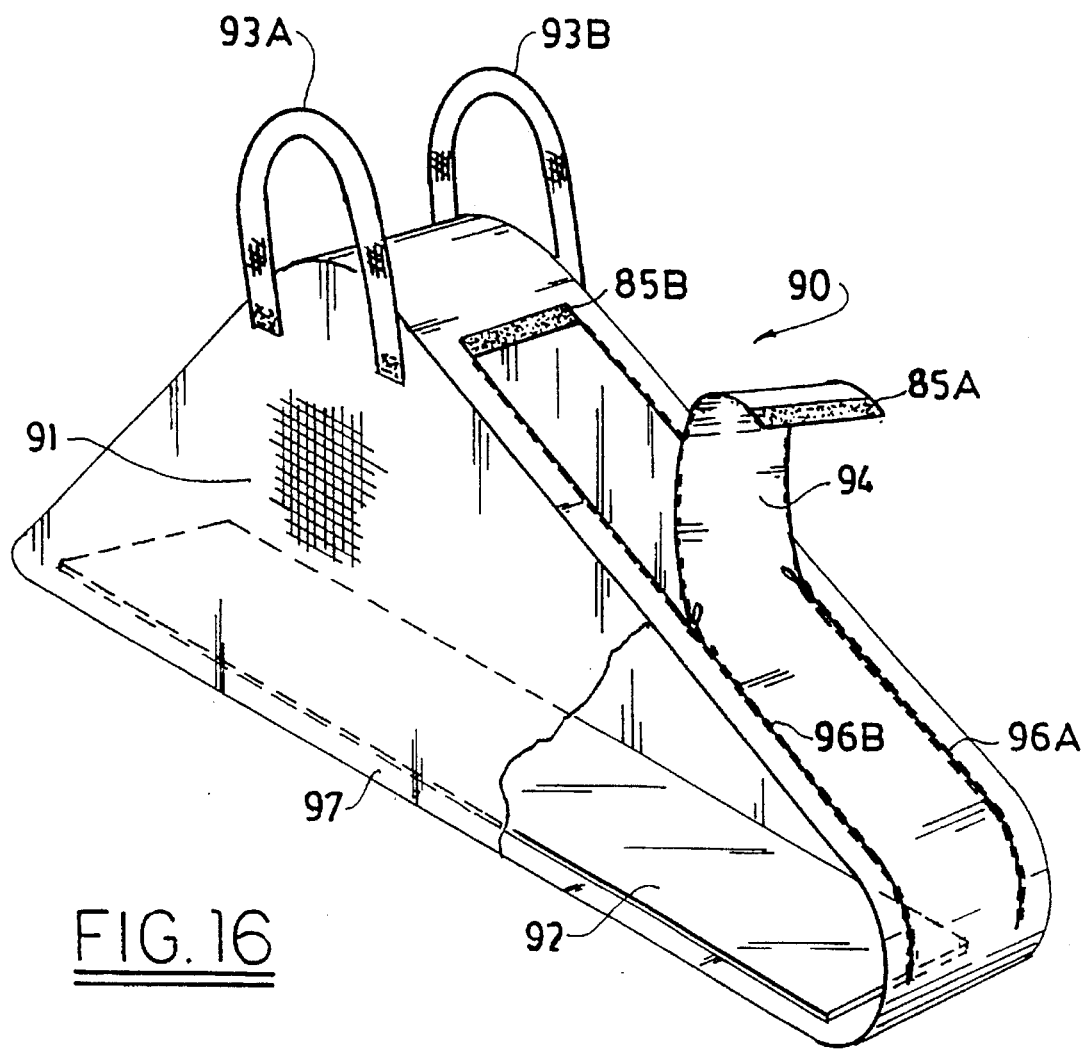
FIG. 16 is a perspective view of the storage bag of FIG. 15 showing the interior of the bag in phantom and via a cutaway section.

FIG. 16 is a perspective view of the bag 90 for the storage and transportation of applicant's tent-like enclosure 30, awning 65, ventilation windows 70, and accessories such as poles 68 and cords showing the interior of the bag in phantom and via a cutaway section. Referring to FIG. 16, said bag 90 is preferably comprised of fabric 91, support plate 92, handles 93A and 93B, and fabric opening flap 94. The various components of applicant's invention are placed 22 in or taken from bag 90 through said fabric opening flap 94. Said fabric opening flap 94 is secured along its uppermost edge by fuzzy fabric strip 85A which attaches to hook fabric strip 85B, and said fabric opening flap 94 is opened and closed by the operation of zippers 96A and 96B. Support plate 92 is suitably fastened to the bottom 97 of said bag 90 to provide rigidity and structural strength to said bag 90.

The fabric 91 of said bag 90 can be constructed of the same variety of weather resistant fabrics as previously described for applicant's tent-like enclosure. Support plate 92 can be constructed of the same variety of materials as previously described for applicant's fixturing plate 10 of Figure. In one embodiment of applicant's bag 90 of FIG. 16, support plate 92 was constructed of ⅛ inch thick high density polypropylene; and the fabric 91 of said bag 90 was acrylic polymer canvas material.

Referring again to FIGS. 1 through 16, the manner of installation of the applicant's modular system for camping in a sport utility vehicle will now be described.

Installation is initiated by lowering the windows in the doors of the vehicle, unlatching the spare tire carrying rack from the tailgate of the vehicle (if said vehicle is so equipped) and swinging it around approximately 150 degrees to its open position, retracting the tailgate window into the tailgate, and lowering the tailgate from its closed vertical position to its open horizontal position. The tent-like enclosure 30, ventilation windows 70, and awning 65 of FIGS. 5, 10, and 9, respectively are removed from the bag 90 of FIG. 16. It should be noted that the procedure for installation is independent of whether the vehicle spare tire is carried inside or outside of the vehicle, as the outside spare tire carrier rack is entirely outside of the tent-like enclosure assembly and thus has no effect on the installation procedure.

Upon removal from bag 90 of FIG. 16, the fixturing plate 10 of FIG. 2 with the collapsed and rolled up tent-like enclosure 30 of FIG. 5 is unfolded from its stored configuration to its installed configuration by operation of the hinge 28 of FIG. 2. Both halves 10A and 10B of the fixturing plate 10 joined by the hinge 28 thus become coplanar and the fixturing plate 10 and collapsed tent-like enclosure 30 assume approximately a trapezoidal shape. The upper edge 12 of the fixturing plate 10 of FIG. 2, having precisely the same contour as the upper edge of the tailgate window of the vehicle, is inserted into the elastomeric tailgate window gasket groove 2 of the vehicle shown in FIG. 4. Referring to FIG. 3, U-bolts 24 are then secured over tailgate door latch posts 8 via the tightening of wing nuts 26A and 26B. Referring to FIG. 5, with the fixturing plate rigidly secured to the vehicle, flaps 40 are secured to the interior side walls i of the vehicle 100 in FIG. 8 via a fuzzy fabric sewn into the flaps 40, and an adhesive backed mating fabric joined to the side walls 1 of the vehicle.

Referring again to FIG. 5, the skirt of material 44 of the tent-like enclosure 30 is drawn over the vehicle tailgate 3 shown in phantom. Referring to FIG. 8, loops 55A of cords 50 (only one side shown) and loops 55B and 55C of cord 52 are secured to the trailer ball 5 of the vehicle 100 and placed under tension.

Referring again to FIG. 5, the fabric doorway 56 and screen 58 beneath said window 56, being secured by zippers 60A and 60B, and 62A and 62B respectively, can be opened, closed, and positioned as desired for entry and exit of the vehicle and for the desired degree of ventilation and weather protection.

The installation of the awning 65 is now described. The awning 65 is unfolded and spread out behind the vehicle 100, with the zipper 66 of FIG. 9 along the edge of the awning 65 aligned immediately adjacent to the zipper 64 sewn into the exterior of the tent-like enclosure 30 of FIG. 5. Said zipper halves are joined together, securing the awning 65 to the tent-like enclosure 30 of FIG. 8. The installation is completed by inserting conventional tent poles 68 into grommets 67, and fixing the position of said tent poles 68 with ropes, elastic cords, and stakes.

The installation of applicant's ventilation window was thoroughly described previously in this specification. Installation of a matching ventilation window on the opposite side of the vehicle is accomplished via an identical procedure, as said windows are mirror images of each other.

Figure 18:
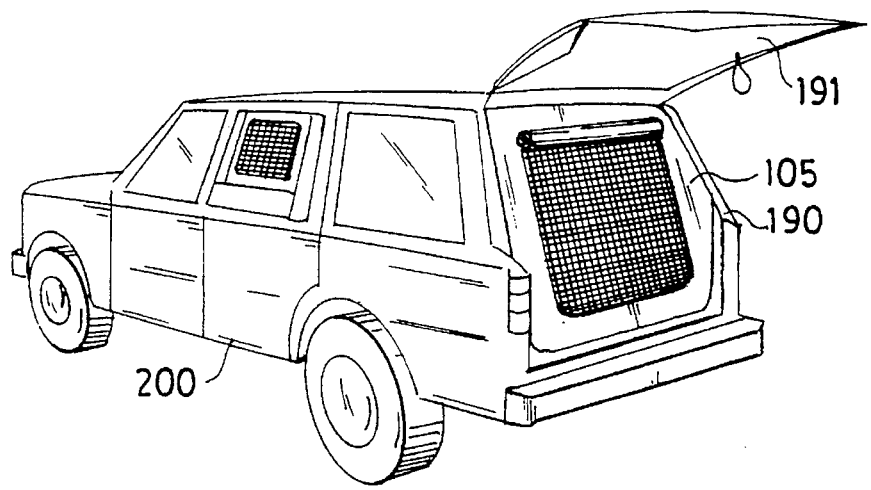
FIG. 18 is an alternative embodiment of applicant's tent-like enclosure, for vehicles which are fitted with a liftgate or cargo doors instead of a tailgate.

FIG. 18 is a preferred embodiment of the applicant's tent like enclosure which is designed for vehicles with a liftgate door, which is raised vertically as shown in FIG. 18, or for vehicles fitted with cargo doors which are hinged to the rear corners of the vehicle and swing open in a horizontal plane. Referring to FIG. 18, it will be seen that applicant's modular tent-like enclosure 105 is fitted to the rear opening 190 of the vehicle 200. Said rear opening 190 results from the raising of the liftgate 191 to the open position.

As will be apparent to those skilled in the art, the modular system 105 of this invention is especially suitable for use on a recreational vehicle of the type with a rear liftgate door which is hingably attached to the rear upper edge of the vehicle and swings open upwardly in a vertical plane; or a rear pair of cargo doors which are hingably attached to the rear corners of the vehicle and swing open in a horizontal plane.

As is known to those skilled in the art, the "Explorer" recreational vehicle is a sport utility vehicle which is sold by the Ford Motor Company of Dearborn, Mich. and which has a rear liftgate door. The "Cherokee" sold by the Chrysler Corporation also is a sport utility vehicle which has a rear liftgate door. The "Suburban" recreational vehicle is a sport utility vehicle which is sold by the Chevrolet Division of the General Motors Corporation and which has a rear pair of cargo doors which are hingably attached to the rear corners of the vehicle and swing open in a horizontal plane. Those skilled in the art will be aware of other vehicles which are manufactured with these configurations.

Figure 19:
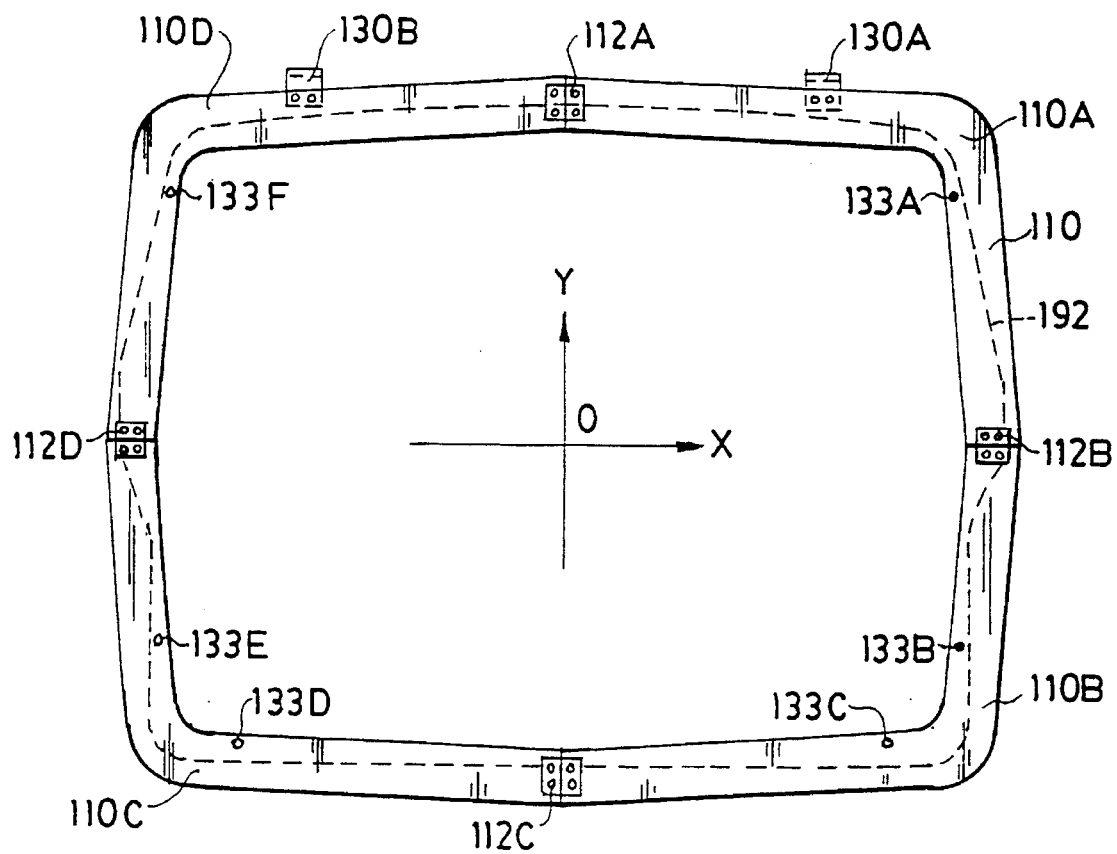
FIG. 19 is an elevation view of the fixturing plate used to secure the tent-like enclosure of FIG. 18 to the vehicle.

FIG. 19 is an elevation view of a fixturing plate 110 used to secure the tent like enclosure 105 (see FIG. 18) to the rear of the vehicle 200 (see FIG. 18).

Referring to FIG. 19, said fixturing plate 110 is approximately a quadrilateral shape structure, which is dimensioned to correspond to the approximately quadrilateral shaped opening 190 (see FIG. 18) at the rear of the vehicle 200 (see FIG. 18).

Referring again to FIG. 19, said fixturing plate 110 is preferably dimensioned to maintain continuous and complete contact with the liftgate weather seal gasket represented by dotted line 192, around the entire perimeter of the approximately quadrilateral shaped opening 190 (see FIG. 18) at the rear of the vehicle 200 (see FIG. 18). In this manner, a weathertight seal of the fixturing plate 110 is made with the rear opening gasket of the vehicle shown by dotted line 192, in a similar manner in which the liftgate 191 (see FIG. 18) is sealed against the weather seal gasket around the rear opening of the vehicle.

Referring again to FIG. 19, applicant's fixturing plate 110 is preferably comprised of four separate sections 110A, 110B, 110C, and 110D, which are secured to each other with hinges 112A, 112B, 112C, and 112D or other suitable means.

Figure 23C:
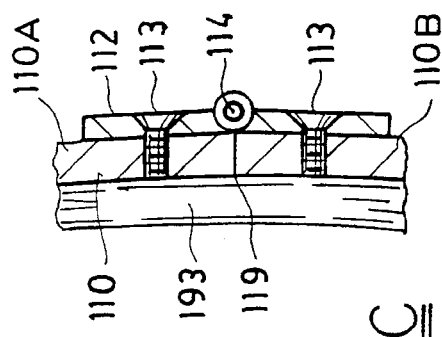
FIG. 23C is an enlarged view of hinge and removable pin means for securing subsections of the fixturing plates of FIG. 19, FIG. 2, and FIG. 17 to each other.

FIG. 23C is an enlarged view of hinge and removable pin means for securing subsections 110A, 110B, 110C, and 110D of the fixturing plate of FIG. 19 to each other.

Referring to FIG. 23C, hinge 112 is secured to fixturing plate 110 with screws 113 or other suitable means. Hinge pin 114 is preferably easily removable. Thus with all four pins removable from hinges 112A, 112B, 112C, and 112D in FIG. 19, said sections 110A, 110B, 110C, and 110D of fixturing plate 110 are easily separated from each other when said tent like enclosure 105 (see FIG. 18) is not installed on said vehicle 200 (see FIG. 18). This feature enables said fixturing plate 110 of FIG. 19 and the tent-like enclosure 105 of FIG. 18 to be easily and quickly dismantled and packed in a compact shape for facile transportation.

Referring again to FIG. 19, it is apparent that the rear opening weather seal gasket represented by dotted line 192 is substantially irregular in shape around the perimeter of the rear opening of the vehicle. However, by carefully defining the geometry of each of fixturing plate subsections 110A, 110B, 110C, and 110D, it is possible to attain a geometry such that fixturing plate subsections 110A, 110B, 110C, and 110D are identical to each other in shape as defined by their perimeters. Thus although the weatherseal gasket shown by dotted line 192 is symmetric about the y axis only of FIG. 19, the fixturing plate 110 is symmetric about both the x and y axes shown in FIG. 19. The geometric shape of this preferred embodiment is more precisely approximated by an octagon. It will be apparent to those skilled in the art that by defining such a geometry, the manufacture of only one subsection part will be required in order to produce the components for the fixturing plate 110. This feature will thus reduce product manufacturing costs substantially.

Referring again to FIG. 19, it is noted that applicant's fixturing plate 110 can be fabricated from the same materials choices and dimensional thicknesses as previously described in this specification for applicant's fixturing plate 10 in FIG. 2.

FIG. 20A is a cross sectional view showing means to fit and secure the fabric of the tent like enclosure of FIG. 18 to the fixturing plate of FIG. 19.

Referring to FIG. 20A, applicants tent-like enclosure 105 is comprised of a fabric covering 111 which is comprised of an outer fabric surface 111A and an inner fabric surface 111B, which are joined at a seam 115 by thread 116 or other suitable means. Inner surface 111B is sandwiched between fixturing plate 110 and weatherseal gasket 193 such that a weatherproof seal is attained.

Referring again to FIG. 19, the construction of tent-like enclosure 105 is such that inner surface 111B is joined to outer surface 111A around the entire perimeter of tent-like enclosure 105. Inner surface 111B is also dimensioned to be of approximately the same width as fixturing plate 110, (of the order of several inches) such that inner surface 111B forms a pouch-like enclosure around fixturing plate 110 around its entire perimeter. In this manner, the fabric covering 111 of the tent-like enclosure 105 and fixturing plate 110 are securely joined to each other without the use of additional fasteners.

This feature will enable lower product cost. If for some vehicles, additional fasteners are required, conventional fastening means for securing fabric to a flat surface may be used, such as snaps, or hook and barb mating fabrics.

FIG. 21 is a perspective view of the tent-like enclosure of FIG. 18 joined to the fixturing plate of FIG. 19.

Referring to FIG. 21, applicant's tent-like enclosure 105 is preferably comprised of a fabric covering 111 with fabric flap 120; screen 121; zippers 122A and 122B for the opening and closure of flap 120; zippers 123A and 123B for the opening and closure of screen 121; webbing strips 124A and 124B suitably secured to tent-like enclosure 111 and fitted with snaps 126A, 126B, 126C, and 126D.

Referring again to FIG. 21, it will be apparent to those skilled in the art that flap 120 and screen 121 can each be opened, rolled up, and secured with webbing 124A and 124B to allow easy entry and exit from the vehicle. It will also be apparent that the overall functionality of this embodiment of applicant's fabric covering 111 is substantially identical to the enclosure 30 in FIG. 5 which was described in detail previously in this specification. It will be further apparent that the fabric enclosure can be made of substantially the same material which was described previously in this specification.

Referring again to FIG. 21, and subsequently to FIG. 20A, dotted line 125 represents the inner edge 117 of the inner fabric surface 111B of the fabric covering 111 which envelops the fixturing plate 110.

Figure 22A:
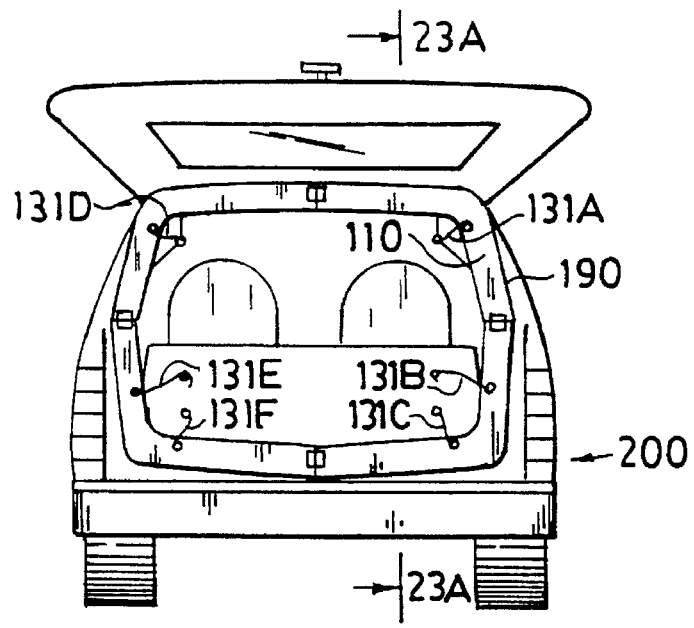
FIG. 22A is a rear elevation view of the fixturing plate of FIG. 19, also showing the fastening means to secure the fixturing plate to the vehicle.

FIG. 22A is a rear elevation view of the fixturing plate of FIG. 19, also showing the fastening means to secure the fixturing plate to the vehicle.

Referring to FIG. 22A, applicant's fixturing plate 110 is preferably secured to the rear opening 190 of the vehicle 200 with elastic cords 131A, 131B, 131C, 131D, 131E, and 131F; as well as brackets 130A and 130B (see FIG. 19).

Figure 23B:
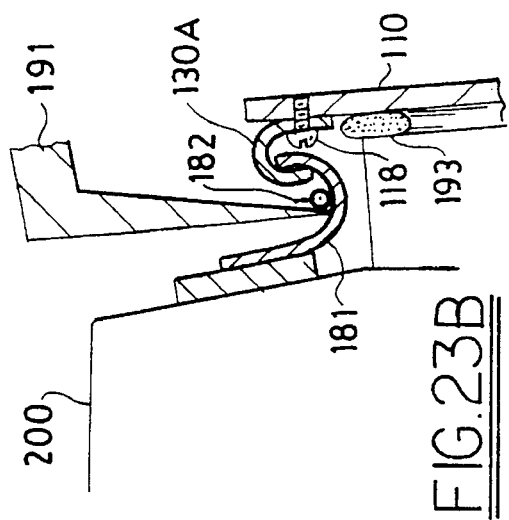
FIG. 23B is an enlarged view of one means for securing the fixturing plate of FIG. 19 to the vehicle.
Figure 23A:
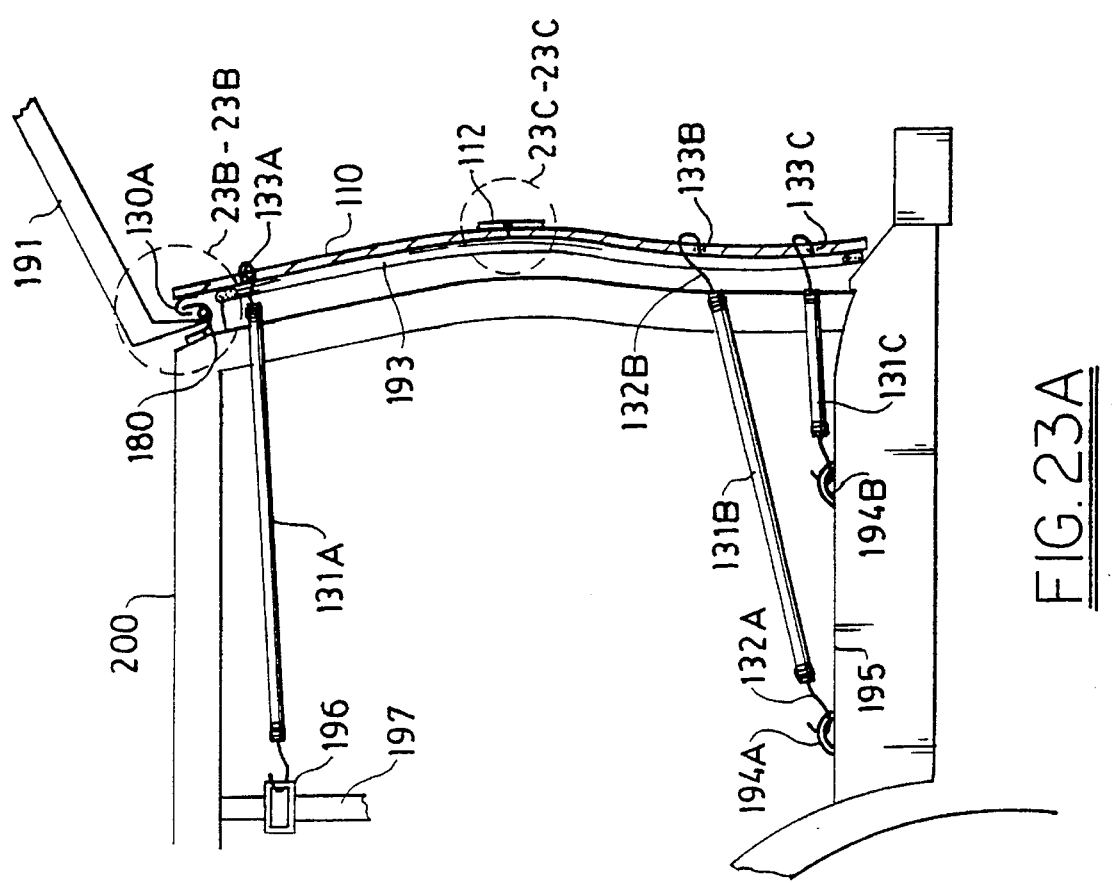
FIG. 23A is a side cross sectional view of the fixturing plate of FIG. 19, with fastening means for securing the fixturing plate to the vehicle.

FIG. 23A is a side cross sectional view of the fixturing plate of FIG. 19 taken along section 23A—23A of FIG. 22A, which depicts fastening means for securing the fixturing plate to the vehicle. FIG. 23B is an enlarged view of one means for securing the fixturing plate of FIG. 19 to the vehicle.

Referring to FIG. 23A, and FIG. 23B, applicant's fixturing plate 110 is supported vertically by the contact of fixturing plate bracket 130A with hinge bracket 181. Fixturing plate 110 is also secured to the vehicle 200 and brought into tight contact with weatherseal gasket 193 by elastic cords 131A, 131B, and 131C. Each of elastic cords 131A, 131B, and 131C is preferably fitted with hooks 132A and 132B at each end, as shown for elastic cord 131B.

Referring further to FIG. 23A, elastic cords 131A, 131B, and 131C, are hooked through holes 133A, 133B, and 133C, respectively. Refer also to FIG. 19 in which holes 133A, 133B, and 133C are also shown in elevation view.

Referring again to FIG. 23A, elastic cord 131A is also hooked to shoulder seat belt support loop 196 which holds shoulder seat belt 197. Elastic cord 131B is also hooked to cargo loop 194A, and elastic cord 131C is also hooked to cargo loop 194B. Cargo loops 194A and 194B are typically provided fastened to the vehicle floor 195 as standard equipment in most sport utility vehicles.

Referring to FIG. 23A, it will be readily apparent to those skilled in the art that applicant's fixturing plate 110 is firmly secured to the vehicle, and that said fixturing plate 110 is flexible and is bent into compliance with the irregular curved surface of the weatherseal gasket 193, thereby making a weatherproof seal.

FIG. 23C is an enlarged view of hinge and removable pin means for securing subsections of the fixturing plate of FIG. 19 to each other.

Referring to FIG. 23C, it will also be apparent that by placing the hinge 112 on the outside of the fixturing plate 110, contact of said fixturing plate 110 with said gasket 193 is maintained at the surface 119 where fixturing plate subsections 110A and 110B are in contact with each other.

It should be noted that the preceding description applies to the securing means for both the left side and the right side of said plate, as they are mirror images of each other, and use identical securing means.

It should be further noted that for simplicity, the fabric covering 111 (see FIG. 20A) of the applicants tent-like enclosure is not shown in FIGS. 23A, 23B, and 23C. It is to be understood, however, that the fabric covering 111 is fitted to the fixturing plate as previously described, and as shown in FIG. 20A.

Figure 22B:
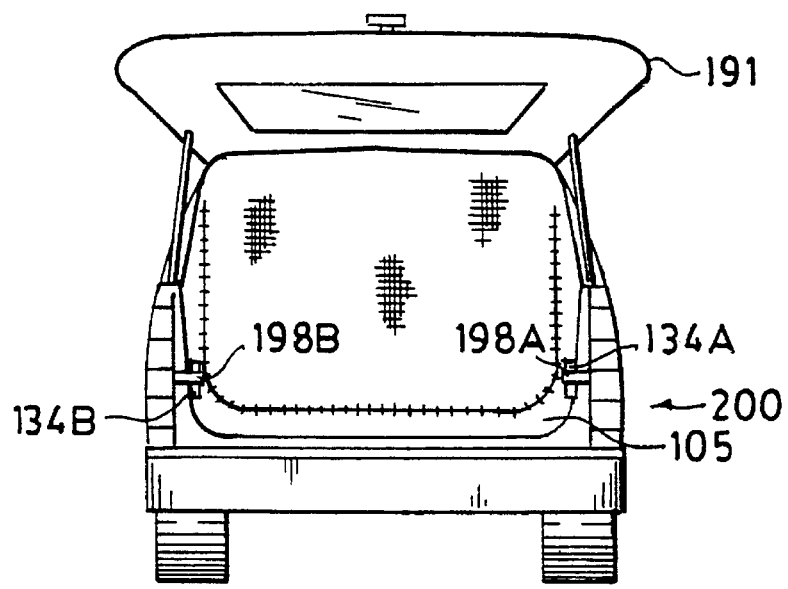
FIG. 22B is a rear elevation view which depicts the installation of the tent-like enclosure of FIG. 21 to the vehicle.

FIG. 22B is a rear elevation view which depicts the installation of the tent-like enclosure of FIG. 21 to the vehicle.

Referring to FIG. 22B, 198A and 198B are latching peg or U-bolt means by which liftgate 191 is secured to vehicle 200 in the closed position. In an alternative embodiment, the applicant's tent-like enclosure may also be secured to the vehicle 200 by the placement of wedges 134A and 134B, cams, or other means between the latch peg means 198A and 198B, and the tent-like enclosure 105.

Figure 24:
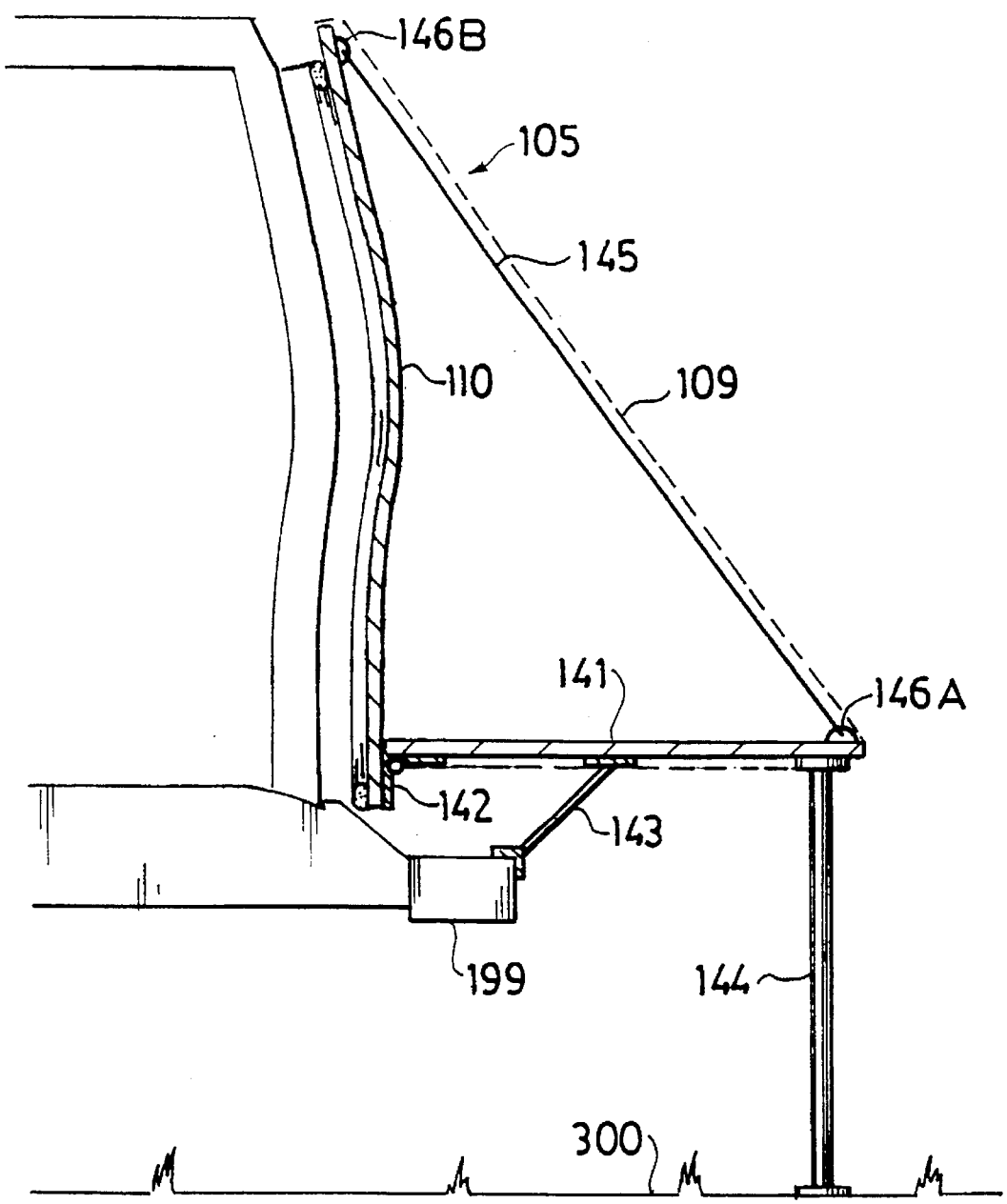
FIG. 24 is an alternative embodiment of the fixturing plate of FIG. 19, with a tailgate-like extension secured to the fixturing plate to extend the available space in the vehicle.

FIG. 24 is an alternative embodiment of the fixturing plate of FIG. 19, with a tailgate-like extension secured to the fixturing plate to extend the available space in the vehicle.

Referring to FIG. 24, tailgate-like extension 141 is fastened to fixturing plate 110 with hinge means 142 or other suitable means. Tailgate-like extension 141 may also be supported by rod means 143 to the vehicle bunker 199; rod means 144 to the ground 300; or guy wire means 145 which is secured to fixturing plate 110 through eye loop 146B and to tailgate-like extension 141 through eye loop 146A.

Referring again to FIG. 24, fabric covering is shown in phantom by dotted line 109 which encloses tailgate-like extension 141. Rod means 143 and 144 may be hingably attached to tailgate-like extension 141 in order to enable compact storage and transportation of the tent-like enclosure 105.

It will be apparent to those skilled it the art that this embodiment provides additional enclosed space within the tent-like enclosure.

It will be further apparent that the aforementioned description is illustrative only and that changes can be made in the components of the apparatus which would easily enable the apparatus to be fitted to a vehicle with cargo doors which are hingably attached to the rear corners of the vehicle and swing outward in a horizontal manner.

Figure 25:
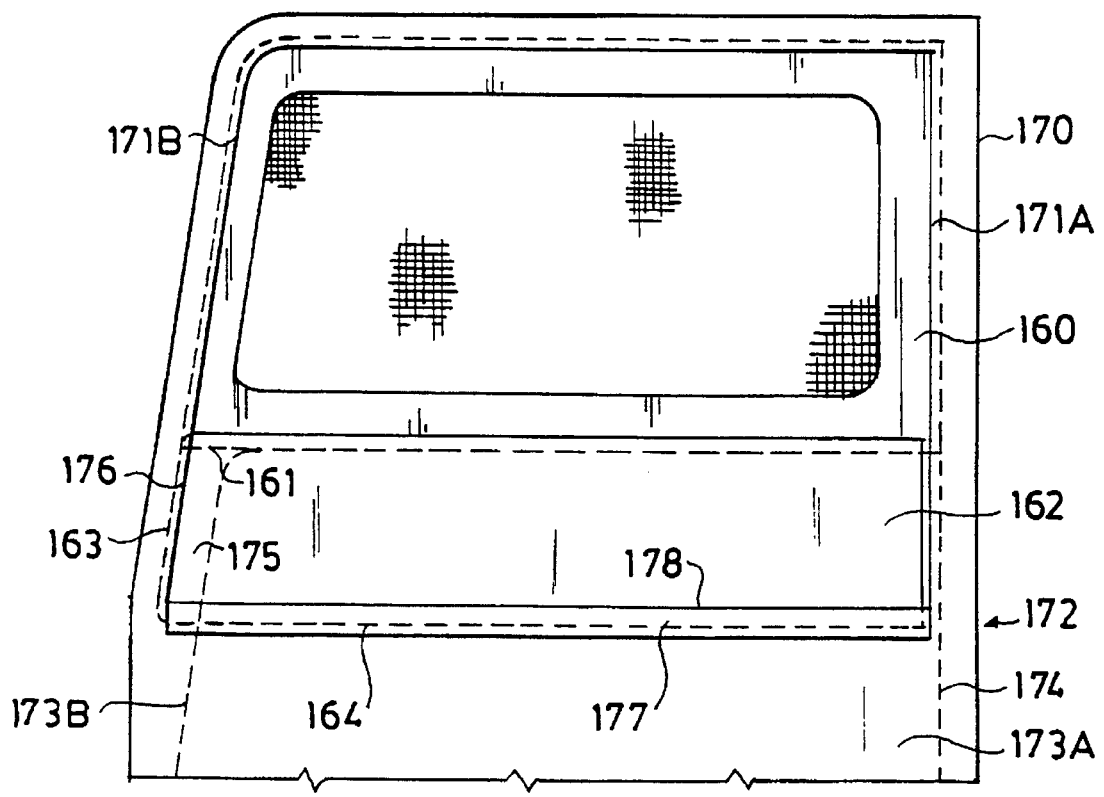
FIG. 25 is an alternative embodiment of applicant's ventilation window of FIGS. 10 through 14.

FIG. 25 is an alternative embodiment of applicant's ventilation window of FIGS. 10 through 14.

Referring to FIG. 25, it will be apparent that window frame edges 171A and 171B are not parallel to each other as in the previously described embodiment with edges 95A and 95B shown in FIG. 11. It will be further apparent that the corresponding edges 173A and 173B of window glass 174 are also not parallel to each other.

Referring further to FIG. 25, when window glass 174 is lowered into the lower portion 172 of vehicle door 170, an open gap 175 results between the edge 173B of window glass 174, and the frame edge 171B of door 170. It will be apparent to those skilled in the art that when ventilation window frame 160 is fitted as previously described in this specification and in FIGS. 11 through 14, the gap 175 exists below the lower edge 161 of ventilation window frame 160.

Referring again to FIG. 25, an additional panel of fabric material 162 is suitably fastened to ventilation window frame 160 with thread or other means known in the art. Said fabric panel of material 162 is dimensioned so that its diagonal edge 163 can be tucked into window gasket groove 176, and its lower edge 164 can be tucked between window glass 174 and gasket 177 located at the line of contact 178 between the window glass 174 and the vehicle door 170.

Referring to FIG. 25, it will be apparent to those skilled in the art that the use of the additional panel 162 of fabric will maintain a weather tight and insect resistant seal around the ventilation window frame 160.

It should be readily apparent that the applicant's invention described above is easily installed and removed from the vehicle; is easily stored and transported; provides superior protection from adverse weather conditions; provides superior ventilation throughout the entire interior of the vehicle; and provides easy entry and egress from the vehicle as compared to other prior art inventions.

It is to be understood that the aforementioned description is illustrative only and that changes can be made in the components of the apparatus, the materials of construction, the order in which they are secured to the vehicle, as well as other aspects of the invention discussed herein, without departing from the scope of the invention as defined in the following claims.

I claim:

1. An apparatus for attaching an enclosure to the back of a motor vehicle comprised of a back section comprising a door, and an opening, wherein said apparatus is comprised of:

a substantially quadrilateral shaped plate, wherein said quadrilateral shaped plate is substantially coplanar, and wherein said substantially quadrilateral shaped plate is flexible, and wherein the perimeter of the cross section of said substantially quadrilateral shaped plate is comprised of at least one substantially flat surface, and wherein said substantially flat surface is the surface of the perimeter of the cross section of said substantially quadrilateral shaped plate which is in closest proximity to the front portion of the vehicle;

a first means for attaching said substantially quadrilateral shaped plate to said motor vehicle, wherein said first attaching means applies a force on said substantially quadrilateral shaped plate which has a component which is perpendicular to said substantially quadrilateral shaped plate;

a second means for attaching said substantially quadrilateral-shaped plate to said motor vehicle;

a substantially weather-proof cover;

and means for attaching said cover to said substantially quadrilateral-shaped plate;

wherein when said weatherproof cover is attached to said substantially quadrilateral-shaped plate and said substantially quadrilateral-shaped plate is attached to said motor vehicle, it encloses the space between said back section of said vehicle and said cover and forms a substantially water-proof enclosure covering said space.

2. The apparatus as recited in claim 1, wherein said substantially quadrilateral shaped plate is congruent with the perimeter of the said opening of said back section of said motor vehicle.

3. The apparatus as recited in claim 1, wherein said substantially quadrilateral shaped plate is comprised of four sections removably attached to each other.

4. The apparatus as recited in claim 1, wherein said substantially quadrilateral shaped plate is comprised of four sections hingably attached to each other.

5. The apparatus as recited in claim 4, wherein said four sections of said substantially quadrilateral shaped plate are identical to each other.

6. The apparatus as recited in claim 1, wherein said substantially quadrilateral-shaped plate consists essentially of plastic.

7. The apparatus as recited in claim 1, wherein said weather-proof cover is comprised of at least about 90 weight percent of fabric.

8. The apparatus as recited in claim 1, wherein said first means for attaching said substantially quadrilateral shaped plate to said motor vehicle is comprised of bracket means.

9. The apparatus as recited in claim 1, wherein said first means for attaching said substantially quadrilateral shaped plate to said motor vehicle is comprised of elastic cord means.

10. The apparatus as recited in claim 1, wherein said weather-proof cover is comprised of flap and means for opening and closing said flap.

11. The apparatus as recited in claim 10, wherein said means for opening and closing said flap is comprised of a first zipper.

12. The apparatus as recited in claim 1, wherein said weather-proof cover is comprised of a screen and means for opening and closing said screen.

13. The apparatus as recited in claim 12, wherein said means for opening and closing said screen is comprised of a zipper.

* * * * *